United States Patent
Barth et al.

[11] Patent Number: 6,126,100
[45] Date of Patent: Oct. 3, 2000

[54] PROCESSING DEVICE FOR CRUSHING, CONVEYING AND PLASTIFYING THERMOPLASTIC SYNTHETIC MATERIAL

[76] Inventors: Gerold Barth, Ziegelofenweg 13, 4073 Wilhering; Manfred Dobersberger, Schmiedgasse 26, 4061 Pasching; Markus Fellinger, Grossdörnbachstrasse 13, 4061 Pasching; Günter Kroiss, Am Bahndamm 2, 4061 Pasching, all of Austria

[21] Appl. No.: 09/284,419

[22] Filed: Apr. 14, 1999

Related U.S. Application Data

[63] Continuation-in-part of application No. PCT/EP97/05649, Oct. 14, 1997.

[30] Foreign Application Priority Data

Oct. 14, 1996 [AT] Austria ..................................... 1801/96

[51] Int. Cl.[7] ................................................. B29B 17/00
[52] U.S. Cl. ....................................... 241/260.1; 241/243
[58] Field of Search .......................... 241/243, 260.1; 425/202

[56] References Cited

U.S. PATENT DOCUMENTS

| | | | |
|---|---|---|---|
| 4,661,290 | 4/1987 | Sauda et al. | 252/626 |
| 4,897,029 | 1/1990 | Seltmann et al. | 425/222 |
| 5,443,588 | 8/1995 | Loppoli | 414/526 |
| 5,462,238 | 10/1995 | Smith et al. | 241/243 |

FOREIGN PATENT DOCUMENTS

| | | |
|---|---|---|
| 658205 | 3/1968 | France . |
| 1262173 | 3/1968 | Germany . |
| 403056152 | 3/1991 | Japan . |
| 2153703 | 8/1985 | United Kingdom . |
| 9325312 | 12/1993 | WIPO . |

*Primary Examiner*—Joseph J. Hail, III
*Assistant Examiner*—William Hong
*Attorney, Agent, or Firm*—Horst M. Kasper

[57] ABSTRACT

A unit for processing thermoplastic synthetic material comprising a machine housing (1) with a delivery cone (12) in whose feed shaft (14) a driven slider (30) presses synthetic material which is to be processed and which is located on a base plate (7) through a feed inlet (11) of a conveyor tube (6) against a processing drum (3) which is placed perpendicularly in the conveyor tube (6) in relation to the direction of the movement of the slider (30). The slider (30) extends over the entire length of the feed inlet (11) which itself extends over the entire blade supporting section (17) of the processing drum (3). Blades (4) are placed thereon in a helical line and operate in conjunction with a fixed counter blade (5) which is fastened to the opening edge (25) of the feed inlet (11). The blades (4) and the associated screw conveyor (9) convey disintegrated synthetic material in axial direction (20) though the conveyor tube (6) towards an outlet (10), which leads downwards into the screw tube (22) of the extruder screw (8) through which the synthetic material is delivered.

28 Claims, 5 Drawing Sheets

PROCESSING DEVICE FOR CRUSHING, CONVEYING AND PLASTIFYING THERMOPLASTIC SYNTHETIC MATERIAL

CROSS-REFERENCE TO RELATED APPLICATIONS

This application is a continuation-in-part application of another international application filed under the Patent Cooperation Treaty Oct. 14, 1997, bearing Application No. PCT/EP97/05649, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to a processing device for comminuting, conveying and plasticizing of thermoplastic synthetic material comprising a conveying device, a comminuting device and a screw-type extrusion machine.

2. Brief Description of the Background of the Present Invention Including Prior Art It is known to comminute plastic material in a grinder and to transport the plastic material into a silo, from which silo the pre-comminuted plastic material is then fed through a tamping device to an extruder, the latter being in most cases a screw-type extrusion machine. This configuration has the advantage that the silo offers a storage capacity by way of which fluctuations in the production of material can be balanced.

On the other hand, a disadvantage of this configuration is its poor thermal efficiency, since the comminuting energy, which is transferred in the grinder in the form of frictional heat onto the plastic material, is again discharged to the surroundings based on the subsequent intermediate storage in the storage silo and thus is lost for the extrusion process. In addition this configuration has the disadvantage, that it requires a considerable amount of space and its construction is very costly.

An apparatus has become known from the printed patent document WO 98/07042, where the material to be processed falls from the top into a container, at the floor of which a cutter disk rotates, the cutter disk pre-comminuting the material and pressing it into an opening disposed in the container wall, where a screw-type extrusion machine receives the material.

An arrangement of this type has the advantage that the comminuting energy that is imparted to the material to be processed in the form of frictional heat can be employed in the extrusion process. However, very substantial disadvantages exist, because this arrangement can only be fed with material particles of limited size and the feeding always has to be performed uniformly, since otherwise the drive motor can be overloaded or the plastic material still in the container can melt down, which may cause clogging or may cause the cutter disk to jam. Therefore, the material to be processed always has to be conveyed into the charging bin in small pieces and at a uniform speed.

However, this necessitates a process of separating the comminuted material according to the size of each piece, which proves to be expensive and complicated, in particular in the case of pressed plastic material or in the case of large solid parts that have to be separated either manually or automatically, requiring a substantial expenditure of labor or an additional substantial investment expenditure in the form of a coarse crushing machine.

Further known is an apparatus for the processing of thermoplastic synthetic material and filler material such as sawdust, for example. With this apparatus, mainly humid material is to be pre-dried and then to be conveyed into an extruder. As a disadvantage of this arrangement, the size of the material that is suitable for feeding to the apparatus is limited, given that here, again, the material falls into a charging funnel by gravity and, in case of oversized pieces of material, the aforementioned problems of motor overload can occur.

U.S. Pat. No. 5,462,238 describes a comminuting device with a cutter drum, where the knives of the cutter drum cut against a stationary counter knife and where two driven feed rollers in a feed funnel are arranged ahead of the cutter drum, effecting a uniform forced feed of insulating material to the cutter drum. The comminuted material is transported by a screw conveyor downstream of the knives of the cutter drum and freely exits in axial direction from the casing tube of the cutter drum.

A processing of large solid or packet-like chunks of plastic is not possible with this feed roller arrangement, because either a blockage or an overloading of the apparatus occurs and also the feeding of the comminuted material to a screw conveyor is not possible with this comminuting apparatus.

The description in the printed patent document WO 93/25312 concerns an apparatus for comminuting and plasticizing of thermoplastic material with two cutter drums furnished with knives engaging into each other, the knives pulling in the material, comminuting the material and stuffing it downward into a screw conveyor aligned on a common axis. The cutter drums employed in this arrangement have the disadvantage that the material to be processed may not consist of overly thin parts or overly small parts nor of large solid pieces such as molten cakes, because this will result in either an overloading of the extruder or of the cutter drum drive or a blockage of the apparatus.

SUMMARY OF THE INVENTION

1. Purposes of the Invention

It is an object of the present invention to eliminate the disadvantages of the available processing apparatuses of the initially recited kind in order to uniformize the process course during the processing independent of the shape of the material as well of the amount which is present in the funnel and that the process course runs uniformly without interferences and in order to obtain the advantages of using the comminuting energy in the extrusion process and furthermore for furnishing a benefication processing device which is simply constructed, which is little susceptible to interferences, and which balances different charge amounts.

These and other objects and advantages of the present invention will become evident from the description which follows.

2. Brief Description of the Invention

The present invention provides

This object is obtained with a processing apparatus according to the preamble of claim 1 with the features of the characterizing part of claim 1. The subclaims refer to particular advantageous embodiments of the invention and form together with the claim 1 simultaneously a part of the description of the invention.

The continuous feed of plastic material of different and very much varying quality is assured by the application of a movable feed apparatus with a single moving operating member in front of the feed opening running down from the top over about a quarter of the circumference of the conveyor tube and reaching over the length of the knife carrying part of the processor drum, and by the arrangement of discharge members in the end region of the processing drum, which discharge members cover at least the exit opening of the conveyor tube, and which are particularly advantageously formed by a conveyor worm or even consist of the there applied circulating knives. There is achieved a further uniformization of the material flow, which is generated in particular by the storing effect of the discharge members and which increases with increasing length of the discharge member carrying part of the processing drum.

A narrow disposition of the paths of the discharge members and of the extrusion worm at the exit opening of the processing drum is important in order to avoid a non-uniform feed, bridge formation and stoppages for which the acute angular, and in particular the rectangular alignment of the processing drum and of the extruder screw are important, because thereby only a nearly touching arrangement of the recited parts of the apparatus can be produced, by way of which the transfer of the comminuting material can be performed without interferences and whereby the feed conditions at the feed opening and the transfer conditions at the exit opening and the automatic control of the feeding depending on the filling degree of the conveyor screw influence and supplement each other.

In addition to the closely spaced arrangement of the discharge member or, respectively, of the conveyor screw blade and of the extruder screw to each other, a uniformly directed sense of rotation of these members is of the importance relative to the conveying of the plastic material for the reliable transfer of the plastic material from the transport tube to the worm tube of the extruder.

The application of a feed opening over the complete axial length of the knife carrying part of the processing drum as well as the application of a transfer device in the form of a driven slider over the complete length of the feed opening results in a much improved feeding of the plastic material, wherein the motion direction of the slider is directed into the feed opening and against the processing drum, which favors the processing capability and the reliability of the feeding in particular.

The application of an automatically controllable pressure force of the slider is of advantage for increasing the throughput power. In this context it is advantageous to perform the automatic control of the pressure force through the power of the drive elements and in addition to perform an automatic control of the rotation speed of the processing drum in the same fashion or in addition to perform an automatic control according to the temperature of the plastic material at the exit opening of the transport tube.

The number of knives of the processing drum and of the spatially fixed counter knives associated with the processing drum can be selected according to the throughput required, wherein the arrangement of the rotating knives along a screw line causes simultaneously a conveying effect in an axial direction, which conveying effect can be improved by the furnishing of similarly screw shaped disposed baffle plates.

Knives and baffle plates can be arranged in multiple paths for higher throughput powers.

Another feature comprises the enlargement of the diameter of the conveyor worm or of the circulating paths of the knives while the diameter of the processing drum remains the same.

It is particularly advantageous to select the arrangement of one or several counter knives and of the rotating knives aligned with their cutting edges at the beginning of cutting into one plane in order that the cut begins simultaneously all over a whole length of the cut edge, whereby thereafter a pulling-in of the plastic material and thereby generated stoppages can be avoided.

The application of screw blades conveying oppositely to the discharge members and in particular of a conveyor screw is of large advantage for the improvement of the feeding of the plastic material into the exit opening of the conveyor tube and for reducing the pressure onto the end plate of the conveyor tube and onto the support of the conveyor tube.

The determination of the length and the structuring of the discharge members and their arrangement relative to the exit opening is of importance for the capability of the apparatus to pickup changes in throughput and to be able to maintain the desired degree of comminution of the plastic material.

Even larger plastic parts are captured within the application of circulating knives, wherein two rows with in each case two knives in each row disposed oppositely to each other on the processing drum, which knives are disposed above the exit opening of the conveyor tube and wherein usually the extension can be found, which extension comminutes together with the fixed disposed knives the material, and the larger plastic parts are for such time and effectively comminuted by the combing running together with the fixedly disposed knives, until the larger plastic parts are captured by the extruder worm and are pulled in. In particular high peaks of torque at the processing drum are avoided thereby, if the knives are disposed staggered relative to each other on the jacket of the processing drum in the circulation direction. The same direction of the circulation direction of the knives and of the extruder worm improves thereby the charging of the extruder.

The application with knife supports at a receiver part insertable into the conveyor tube is advantageous for the maintenance of the spatially fixed knives.

The alignment of the front edges of the circulating knives relative to an axial plane of the processing drum is of importance, wherein the tamping effect is increased by the leading arrangement of the circulating knives on the processing drum. The transfer of the material is improved by a small distance between the knives and the extruder screw.

The application with the knife holders on a cutter bush is important for the maintenance of the rotating knives and for their exchange, wherein the cutter bush is slid onto the processing drum following the knife carrying part.

The arrangement of a pressure ring as a closure of the processing drum toward the front side of the bearing casing prevents the buildup of pressure between the processing drum or, respectively, its shaft and the bearing casing and thus the occurrence of axial forces and an increase of the bearing loading. For this reason a slot as narrow as possible in the radial direction between the pressure ring 39 and the inner wall 24 of the conveyor tube 6 is advantageous in order to prevent that coarse material passes into the region of the fine sealing of the bearing 33 and causes damages.

The application of knives on the processing drum is not required in case of processing of the small part plastic material, the arrangement of one row or two rows of knives is sufficient above the exit opening into the extruder. The feeding of the material can be performed over the total length of the processing drum and a shaft shaped feed device can be furnished, wherein the shaft shaped feed device is furnished on the top in the feeding device, because in case of this kind of materials no staggered, metered feeding is required, since the comminuting work can substantially be dispensed with.

It is necessary to remove attached humidity because the small part material has passed through a washing plant in most cases. This can be very effectively performed with a stream of drying air which stream flows from bottom to top in a counter current to the flow of materials and which is cleaned in a processing plant and dried and it is returned after heating for an improvement of a picking up the humidity.

The conveyor worm of the processing drum is subdivided into the left screw and right screw conveyor worm disposed on the two sides of the exit opening according to an arrangement of particular power capability for the processing of small particle plastic material, wherein the tamping and/or cutter tools can run above the exit opening between the left screw conveyor worm and the right screw conveyor worm and wherein the left screw conveyor worm and the right screw conveyor worm feed the material furnished from two sides particularly effective to the extruder worm.

A large opening width of the feed opening in the conveyor tube, as seen from the charge device, allows also an increase in the feed amounts and thus in the throughput power.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
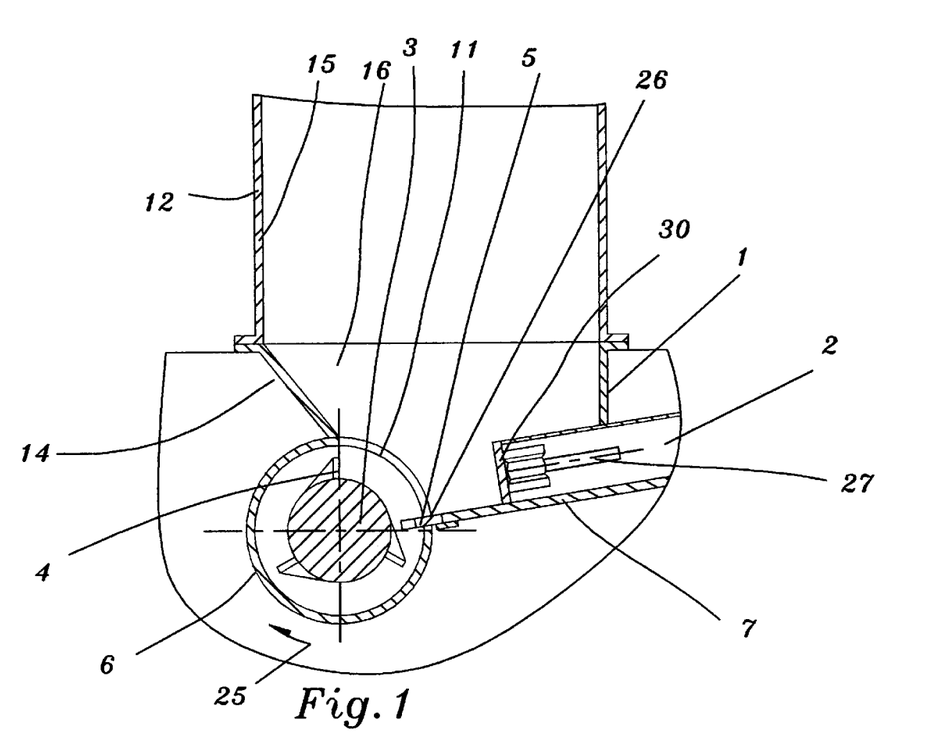
FIG. 1 is a partial sectional view through a processing apparatus and with as the processing drum in a radial sectional view.

There is shown in FIG. 1 an apparatus comprising a machine casing 1 with a feed funnel 12 placed thereon, wherein the lower connecting feed shaft 14 of the feed funnel 12 is closed with a floor plate 7, wherein the floor plate 7 runs downwardly inclined and wherein the floor plate 7 ends at the feed opening 11 of a horizontally aligned conveyor tube 6 of the comminuting apparatus.

A processing drum 3 is disposed in a horizontal position in the conveyor tube 6, is rotatably inserted, and the processing drum 3 is on two sides supported at bearings 33 (FIG. 2) and is drivable by drive shaft 35 connected to a motor 34.

The processing drum 3 comprises a part 17 carrying the knives, wherein the knives 4 are attached radially protruding along a circumferential screw line 28 of the knife carrying part 17 and out of a part 18 carrying the discharge member following to the knife supporting part 17, wherein the discharge members 19 of the discharge support carrying part 18 are formed by a conveyor screw 9. The feed opening 11 of the conveyor tube 6 reaches in axial direction 20 over the complete knife supporting part 17 of the processing drum 3 and is surrounded by the front wall 15 and the two side walls 16 of the feed funnel 12, which side walls 16 together with the floor plate 7 form the feed shaft 14.

The floor plate 7 reaches up to the opening edge 26 (FIG. 1) disposed following in the circumferential direction 25 of the processing drum 3, wherein a through going, spatially fixed disposed counter knife 5 is attached to the opening edge 26 and said counter knife 5 closing planar together with the opening edge 26, wherein the counter knife 5 protrudes into the conveyor tube 6 combingly cutting with the knives 4 of the processing drum 3, whereby in case of a beginning cut the cutting edges of the knives 4 and of the counter knife 5 are disposed in one plane. As can be recognized from FIG. 1, the rotating knives 4 define planes essentially intersecting the rotation axis of the processing drum 3. The cuting edges of the knives 4 are essentially extending in a direction parallel to the rotation axis of the processing drum 3. As can be seen from FIG. 2, the rotating knifes 4 are disposed in axial direction with a distance left between axially neighboringly disposed knives 4 thereby forming kniveless intervals in the direction of the processing drum axis. The spatially fixed knives 5 are preferably disposed facing the kniveless intervals formed by the rotating knives 4 on the processing drum 3.

The floor plate 7 is preferably disposed at an angle of from about 10 to 30 degrees relative to a horizontal such that material falling onto the floor plate 7 gravitates or can be pushed by the slider 30 into the action area of the processing drum 3. The blade of fixed knives 5 preferably extends in the same plane as the floor plate 7 and represents an extension of the floor plate 7 such that materials pushed over the floor plate 7 will slide over the blade of fixed knives 5 and be hit and comminuted by the rotating knives 4.

Figure 3:
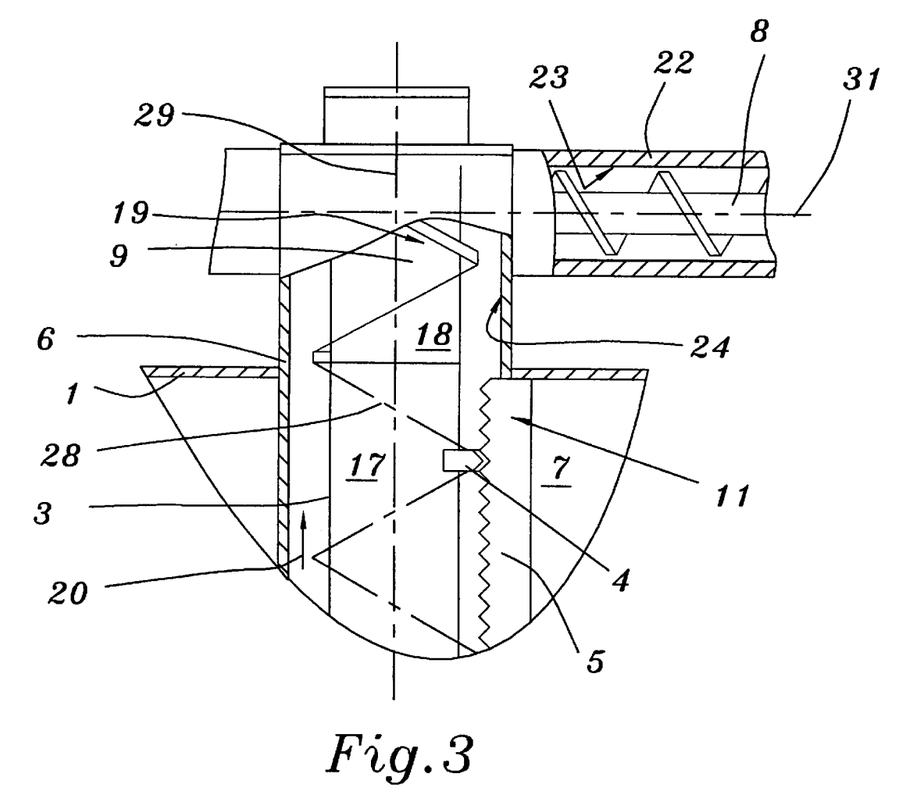
FIG. 3 is a partial sectional view in a top planar view onto the processing apparatus according to FIGS. 1 and 2.

The fixed knives 5 preferably exhibit a configuration resembling a series of saw teeth and can have a zig-zag structure shown in FIG. 3. The rotating knives 4 can be formed with triangular tips, where these tips are formed such as to be able to pass closely through the recesses of the blade with the fixed knives 5. There can be from about 10 to 50 such recesses and preferably there are from about 15 to 30 such recesses. Preferably every second such recess is associated with a corresponding rotating knife 4 on the processing drum 3.

A slider 30 extending over the full length of the feed opening 11 is supported on the floor plate 7. The slider 30 is movably led as a charge device 2 with a hydraulic force cylinder 27 against the processing drum 3 up to the feed opening 11. The direction of motion of the slider 30 is substantially perpendicular to the rotation axis of the processing drum 3. The feed opening preferably assumes a sector around the drum axis in the area of the rotating knives 4. The sector extends preferably above the floor plate 7 and the fixed knives by an angle of from about 60 to 80 degrees. The upper side of the sector is defined by a sheet of feed shaft 14 connecting the conveyor tube 6 to the feed funnel 12. The obtuse angle between the sheet of the feed shaft 14 and the floor plate 7 can be from about 110 to 150 degrees. Preferably the connection point of the sheet of the feed shaft 14 and of the conveyor tube 6 is disposed substantially vertically above the axis of the processing drum 3. This allows that the conveyor tube 6 has an open sector of from about 60 to 80 degrees and thereby prevents overloading of the processing drum with too large amounts of materials and prevents interferences during operation of the processing device.

An exit opening 10, which simultaneously forms the filler opening into the worm tube 22 of the extruder screw 8, is directed downwardly and disposed at the circumference of the conveyor tube 6 in the end region 21 of the processing drum 3, wherein the comminuted plastic material is transported by the conveyor screw 9 of the processing drum 3 toward and through the extruder screw 8.

Figure 4:
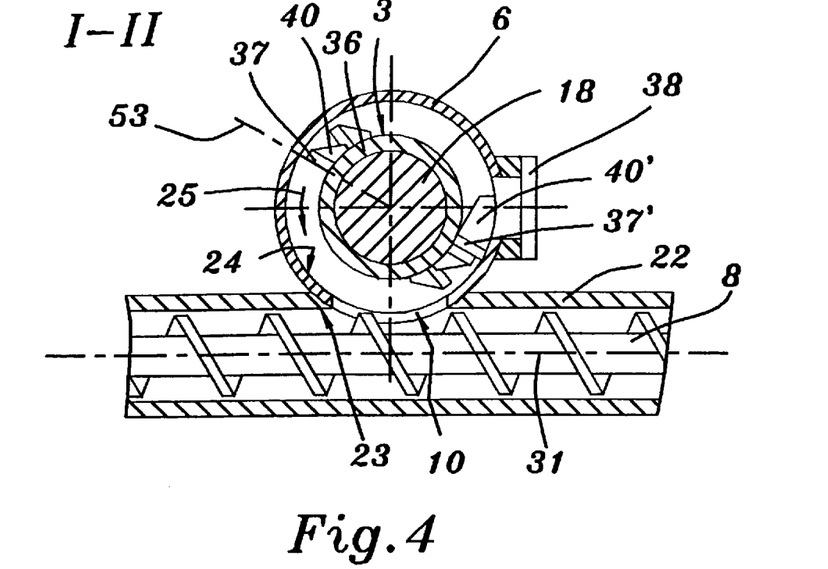
FIG. 4 is a staggered longitudinal sectional view according to section line I-II through the longitudinal axis of the extruder tube and through a cross-section through the end of the processing drum, running as is shown in FIG. 5.

The paths of the extruder screw 8 and of the conveyor screw 9 are disposed such that they just do not touch each other, thereby a problem free transfer of the material is assured. The inner wall 23 of the worm tube 22 of the extruder 8 and the inner wall 24 of the processing drum 3 follow immediately to each other, whereby the two cylindrical tubes penetrate each other as can be seen in FIG. 4. The penetration is constructed such that the respective blades of the processing drum 3 in the end region 21 and of the extruder screw 8 will not contact each other during operation.

Figure 2:
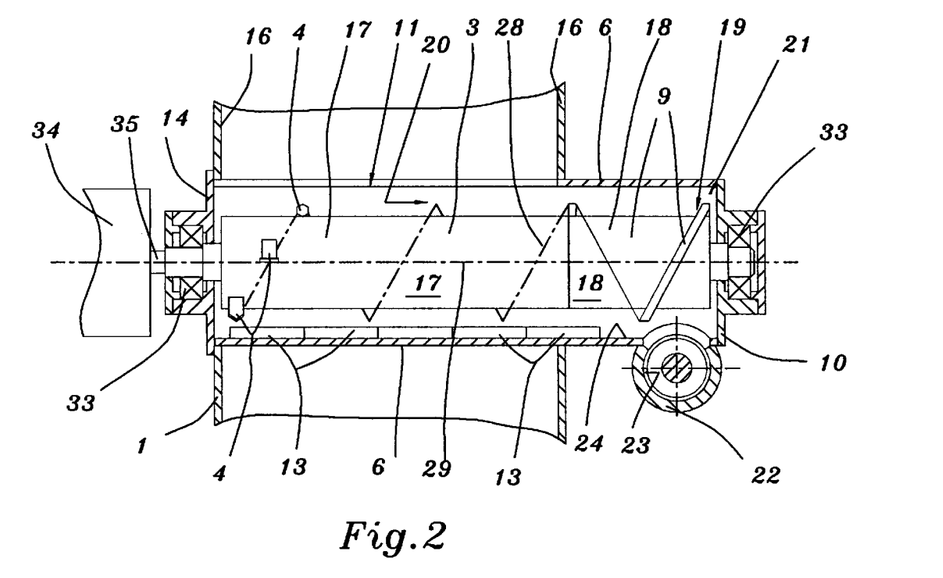
FIG. 2 is a partial sectional view of the processing apparatus in a side elevational view, in a longitudinal section through the processing drum.

The sense of circulation of the conveyor screw 9 and of the extruder worm 8 is of the same direction at the discharge opening 10 of the conveyor tube 6 relative to the transport direction. The worm tube 22 of the extruder screw 8 is aligned with its longitudinal axis 31 at a right angle relative to the longitudinal axis 29 of the processing drum 3 as shown in FIGS. 2, 3, and 4. The extruder screw 8 is generally disposed at a level below the processing drum 3.

The plastic material disposed on the floor plate 7 of the feed shaft 14 to be processed is pressed with the driven slider 30 against the processing drum 3, wherein the processing drum 3 is disposed perpendicular to the direction of motion of the slider 30.

The plastic material is initially comminuted and advancingly transported in an axial direction 20 through the conveyor tube 6 into a direction of the exit opening 10 in the jacket of the conveyor tube 6 and is delivered to the worm extruder with the aid of the knives distributedly disposed on the processing drum 3 along a circumferential screw line 28 over the processing drum 3 and the thereto following conveyor screw 9.

Baffle plates 13 (FIG. 2) are screw shaped disposed at the inner wall 24 of the conveyor tubes 6 and are disposed in the same helical sense as the rotating knives 4, which baffle plate 13 serves as a counter support of an improved guiding of the comminuted plastic material upon transport through the conveyor tube 6.

The play between the cutting edge at the start of the cutting process is substantially eliminated by the arrangement of the spatially fixed counter knife 5 in a such a way that at the beginning of the cutting process the instantaneously engaging cutting edges of the moving knives 4 and of the counter knife 5 are disposed in a plane which is disposed parallel to the face of the floor plate 7, whereby a simultaneous cut can be performed.

In order to be able to obtain an optimum course of the process, there exists on the one hand the possibility to control the press-on force of the driven slider 30 against the plastic material depending on the power consumption or on the current consumption of the motor of the extruder worm 8 or, respectively, of the motor 34 of the processing drum 3 and on the other hand to automatically control the rotation speed of the processing drum 3 depending on the temperature of the plastic material in the exit opening 10 of the conveyor tubes 6 or, respectively, depending on the power consumption or current consumption of the motor of the extruder screw 8, in order to maintain the mass throughput of comminuted plastic material in the conveyor tubes 6 at a constant level and not to allow to occur an accumulation of material in the region of the exit opening 10 or at the input of the extruder screw 8 in the worm tube 22 and thus not to allow a temperature rise to above the melting temperature of the plastic material.

Figure 5:
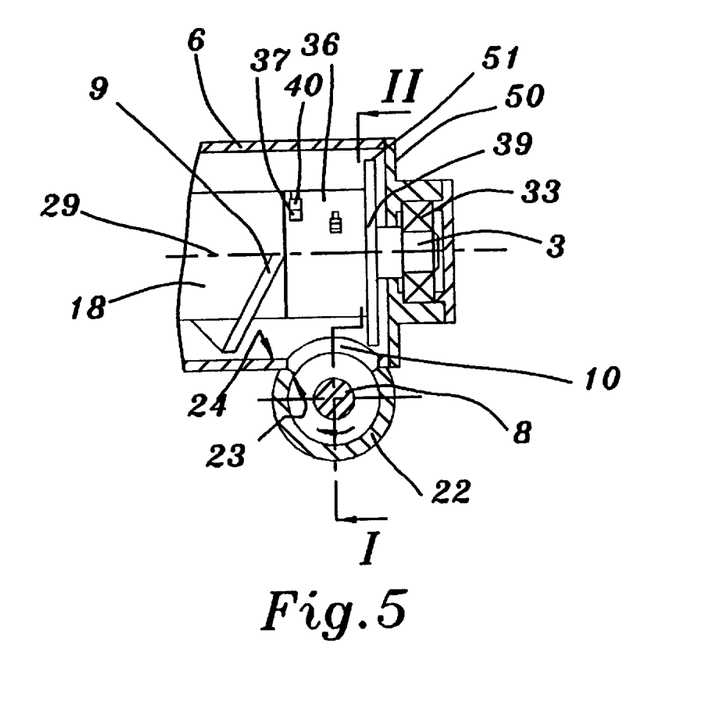
FIG. 5 is a longitudinal sectional view through the end region of the processing drum and a cross-section through the extruder tube.

A bush 36 is slid on in the end region of the processing drum 3 following to the transport screw 9 according to the embodiment of the present invention illustrated in FIGS. 4 and 5, wherein the cutter bush 36 supports the circulating knives 37 at knife supports 40, which knife supports 40 carry the circulating knives 37 and which cutter bush 36 closes with a pressure ring 39 against the bearing casing 50, wherein the pressure ring 39 exhibits a larger diameter as the processing drum 3 and reaches up to close to the inner wall 24 of the conveyor tube 6 and forms there a narrow slot 51 of from about 0.2 to 0.4 mm and is disposed at a small distance in front of the front side of the removable bearing casing 50.

Bearing holders 40 are disposed in two neighboring radial rows on the cutter bush 36, wherein the circulating knives 37 are attached at the bearing holder 40 and are in each radial row attached staggered by 180 degrees to the jacket of the cutter bush 36. The neighboring knives 37 of the two radial rows are disposed staggered relative to each other in order to decrease the peaks of force during cutting. The cutter bush is located on the processing drum 3 immediately above the exit opening 10 in order to facilitate discharge of material from the conveyor tube 6 through the exit opening 10.

The circulating knives 37 are disposed lying thereby with frontwardly disposed edges in axial planes 53 of the processing drum 3.

The circulating knives 37 cut the material to be processed against the spatially fixedly disposed knives 37', which knives 37' are attached at knife holders 40', which knives 37' are disposed aligned in a row parallel to the axis of the processing drum 3, which knives 37' are attached on a receiver part 38, which receiver part 38 is inserted and screwed together through a sideways disposed access opening at the conveyor tube 6. The circulating knives 37 comb thereby with the spatially fixed knives 37' in the circulation direction 25 from below to the top and thereby cut with the side edges.

The exit opening 10 of the conveyor tube 6 forms the filler opening in the worm tube 22 of the extruder screw 8 and the circulating knife 37 and the circumference of the extruder screw 8 are approaching each other nearly contacting. The inner diameter of the conveyor tube 6 can be from about 1.5 to 10 times the inner diameter of the worm tube 22 and is preferably from about 3 to 5 times the inner diameter of the worm tube 22.

Figure 6:
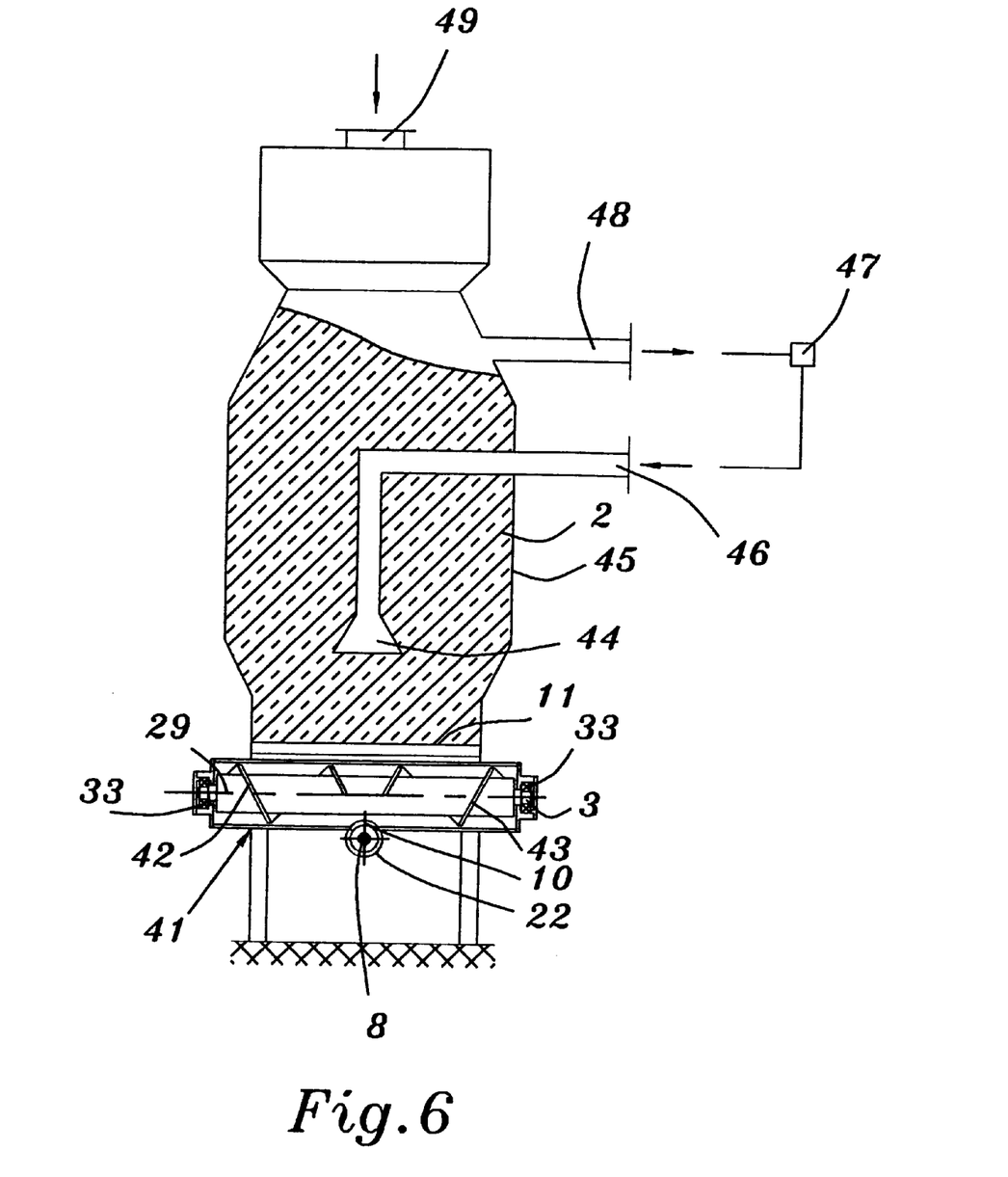
FIG. 6 is a vertical sectional view through the feed device, the casing of the processing drum and the extruder tube in cross-section.

An embodiment of the invention is a shown in FIG. 6, where the conveyor tube 6 of the processing drum 3 exhibits a central exit opening 10 in downward direction, which exit opening 10 simultaneously forms the filler opening of the worm tube 22 of the extruder screw 8.

The conveyor tube 6 forms a casing 41 for the processing drum 3, wherein the processing drum 3 is furnished with a left hand screw conveyor worm 42 and with the right hand screw conveyor worm 43, or wherein the conveyor worms are disposed on two sides of the central exit opening 10 and leave open a central region on the processing drum 3 in front of the central exit opening 10, by having tamping tools or knives 37 attached in the central region and distributed in a radial direction over the circumference.

A feed opening 11 reaches upwardly over the length of the casing 41, which feed opening 11 is covered by drying container 45 forming the charging device 2, wherein the drying container 45 is furnished with an above disposed feed device 49 and exhibits a side feed 46 and an upper output 48 for the drying gas, which side feed 46 and an upper output 48 are connected to a processing plant 47 of the drying gas.

A blow-in nozzle 44 for the dry, heated air is disposed in the drying container 45 in the region above the feed opening 11, which blow-in nozzle 44 is connected through a feed line to a source of dry air disposed outside.

The air, which is loaded with the humidity of the material, is fed into an upper part of the drying container 45 through a discharge line to an output 48.

The feed line 46 and the discharge 48 are connected to a processing plant for the air, wherein cleaning, drying and heating takes place.

It will be understood that each of the elements described above, or two or more together, may also find a useful application in other types of waste system configurations and comminuting procedures differing from the types described above.

While the invention has been illustrated and described as embodied in the context of a processing device for crushing, conveying, and plastifying thermoplastic synthetic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A processing apparatus for thermoplastic plastic material comprising:
   a first drive;
   a horizontally disposed conveyor tube;
   a feed opening disposed at the conveyor tube and substantially upwardly directed for feeding plastic material, wherein the feed opening extends into the about a quarter of the circumference of the conveyor tube and reaches down from the top up to the middle of the conveyor tube and extends in an axial direction;
   an exit opening disposed at the conveyor tube for discharging plastic material, wherein the exit opening is placed at the circumference of the conveyor tube and directed essentially downwardly in the end region of the conveyor tube;
   a processing drum connected to and driven by the first drive and disposed in the conveyor tube, wherein the processing drum circulates driven in the horizontally disposed conveyor tube for conveying in axial direction of the conveyor tube toward the exit opening and wherein the conveyor tube surrounds the processing drum from all sides;
   knifes attached to the processing drum for comminuting and conveying;
   an extruder device immediately following to the processing drum, for plastification and in particular for forming granules;
   at least one spatially fixed counter knife disposed at the conveyor tube for interacting with the rotating knives in crushing plastic materials in the conveyor tube;
   a worm tube surrounding the extruder device, wherein longitudinal axes of the processing drum and of the worm tube include together in a vertical projection at least one acute angle;
   a fill opening of the worm tube disposed connected to the exit opening of the conveyor tube;
   a feed shaft connected to the feed opening;
   a movable charging device coordinated to the feed opening of the processing drum and located in the predisposed feed shaft for feeding plastic material into the conveyor tube, wherein the charging device is adapted in the feed speed to the filling level of the processing drum;
   means for automatically controlling the movable charging device in a reverse ratio to the filling level;
   a conveyor worm disposed on the processing drum and immediately following to the knives of the processing drum, wherein the paths of the blades of the conveyor worm of the processing drum and blades of the extruder screw are running at a slight distance from each other.

2. The processing apparatus according to claim 1 further comprising
   knife supporting parts attached to the processing drum, wherein the rotating knives are attached to the knife supporting parts;
   a feed shaft attached to the feed opening, wherein the feed opening of the conveyor tube is pre-disposed to the feed shaft;
   a floor plate for closing the feed shaft, wherein the floor plate is disposed inclined and of falling at an angle relative to the feed opening, wherein the floor plate reaches up to an opening edge disposed following in circumferential direction of the processing drum and wherein the floor plate extends over the complete length of the feed opening and of the movable charging device.

3. The processing apparatus according to claim 2 further comprising
   a hydraulic cylinder connected to the movable charging device, wherein the movable charging device is formed by a movable slider, wherein the movable slider reaches over the width of the floor plate and is slidable on the floor plate up to the feed opening of the processing drum, at a right angle to the axial direction of the conveyor tube by a hydraulic force cylinder.

4. The processing apparatus according to claim 3 wherein the slider is moved by the hydraulic cylinder and wherein the hydraulic cylinder exerts an automatically controllable pressure force onto the plastic material to be charged, and further comprising
   means for automatically controlling a hydraulic cylinder, wherein the pressure force of the slider is automatically controlled depending on the current consumption of a drive of the extruder worm and/or of a drive motor of the processing drum.

5. The processing apparatus according to claim 1 wherein a plurality of knives are attached along a radial row at the circumference of the processing drum and are attached to the processing drum, wherein the knives are disposed along a circumferential screw line and wherein the knives run together with at least one spatially fixed counter knife, which spatially fixed counter knife reaches over the full length of the feed opening in an axial direction, wherein the periphery of the cutters of the moving knives comb closely and without touching with the periphery of the cutters of the counter knife and wherein the over their full cutting length cutting knives are essentially disposed lying in a plane.

6. The processing apparatus according to claim 1 further comprising
 means for automatically controlling the rotation speed of the processing drum depending on a temperature of the plastic material at the exit opening of the conveyor tube.

7. The processing apparatus according to claim 1 wherein the processing drum with its axial longitudinal direction is aligned at a right angle to the longitudinal axis of the extruder screw and of the worm tube and is attached to the worm tube.

8. The processing apparatus according to claim 1 further comprising
 a plurality baffle plates attached at an inner wall of the conveyor tubes at distances from each other, wherein in case of an arrangement of the knives on the processing drum along a circumferential screw line, then the arrangement of the knives exhibits of the same helical sense as the several baffle plates.

9. The processing apparatus according to claim 8 wherein the other circulation direction of the processing drum coincides with the transport direction of the extruder screw at the exit opening.

10. The processing apparatus according to claim 1 wherein the feed opening reaches over part of a knife carrying part of the processing drum and/or several spatially fixed counter knives are applied over the complete length of the knife carrying part of the processing drum.

11. The processing at apparatus according to claim 1 wherein the knife carrying part of the processing drum reaches over the complete to length of the processing drum and covers the exit opening with the knives disposed in the end region of the exit opening, wherein at least one counter knife ends at the feed opening in front of an end region of the processing drum disposed in the closed part of the conveyor tube.

12. The processing apparatus according to claim 1 wherein a discharge member carrying part of the processing drum carries discharge members, wherein the discharge members reach at least over a step winding of a screw line over the circumference of the processing drum and at least the exit opening of the conveyor tube covers and is formed by a single step conveyor screw.

13. The processing apparatus according to claim 1 wherein four screw blades with a small axial extension relative to the discharge member or relative to the conveyor screw and with an opposite helical screw direction are attached at the end of a discharge member carrying part of the processing drum.

14. The processing apparatus according to claim 1 wherein a plurality of knives rotating within the processing drum are disposed at the end of the discharge member carrying part of the processing drum are attached in a radial row, at standard distances distributed over the circumference of the processing drum with knife holders, and that two radial rows of knives are disposed in axial direction at distances next to each other and are disposed on the processing drum, wherein the neighboring knives of neighboring radial rows are disposed step wise staggered relative to each other on the processing drum in circumferential direction and the circulating knives combing engagingly cut together with the spatially fixed knives.

15. The processing apparatus according to claim 1 wherein the spatially fixed knives are attached together with the knife holders on a receiver part insertable into the conveyor tube, and which spatially fixed knives are preferably disposed in a row, and which receiver part is attached by a side access opening.

16. The processing apparatus according to claim 1 wherein the circulating knives disposed on the jacket of the conveyor drum are disposed in an axial plane of the transport drum with a front edge directed in the circulating direction or the circulating knives are disposed leading relative to the front edge and are attached passing by with the outer edges at the outer circumference of the transport members of the extruder screw at a distance small relative to the size of the particles of the material to be processed.

17. The processing apparatus according to claim 1 wherein the circulating knives of the processing drum are attached to a cutter bush, wherein the cutter bush is slid onto the processing drum.

18. The processing apparatus according to claim 17 further comprising
 a pressure ring inserted between the cutter bush and the bearing casing closing the conveyor tubes on the front face, wherein the diameter of the pressure ring is larger than the diameter of the processing drum and wherein the pressure ring is sealingly reaching up to the inner wall of the conveyor tube and there forms a slot of a diameter of in particular from about 0.2 to 0.4 mm, wherein a labirynth seal is placed at the front side circumferential region of the slot directed to the front side of the bearing casing.

19. A processing apparatus for the comminuting and the conveying of thermoplastic plastic material comprising a comminuting device for comminution and conveying; an immediately following extruder apparatus for plastification and granulation, wherein the comminuting device of the processing apparatus is furnished with a single knife carrying processing drum, wherein the processing drum runs driven in a horizontally disposed conveyor tube, wherein the conveyor tube is furnished with a feed opening substantially upwardly directed and with a predisposed feed shaft for the plastic material surrounding the feed opening on all sides and with an exit opening, wherein a conveyor screw is disposed above the processing drum and is constructed transporting in an axial direction relative to the exit opening, wherein the feed opening of the processing drum, to which processing drum there is pre-disposed a feed device for the feeding of the plastic material into the processing drum, wherein the casing formed as a conveyor tube is incorporated essentially over the part of the processing drum carrying the conveyor screw, which processing drum ends in the region in front of the exit opening at the circumference of the conveyor tube, wherein the exit opening is substantially downwardly directed, wherein at least one row of tamping tools and/or knives is applied in the region above the exit opening, wherein the feed speed is automatically controllable adapted to the degree of filling of the processing drum and in the inverse ratio to this degree of filling, wherein the filling opening of the worm tubes of an extruder screw follows to the exit opening, wherein two inner walls substantially immediately connect to each other, wherein the paths of the discharge members of the processing drum and of the extruder screw are running at a small distance to each other, and in particular nearly touching each other, and wherein the longitudinal axes of the processing drum and of the worm tubes include with each other an acute to rectangular angle.

20. The processing apparatus according to claim 19 wherein the charging device comprises a shaft-shaped drying container, wherein the drying container is furnished with an upper feed device, wherein the one of feeds for the drying gas, in particular air, is lead to a blow-in nozzle, which blow-in nozzle is disposed in the region above the feed opening, which the feed opening is led with the received humidity of the material into the upper region of the drying container over a discharge line to the exit and away from the exit or is fed to a processing plant for cleaning and drying, wherein the drying gas of the feed is fed from the processing plant to the blow-in nozzle.

21. The processing apparatus according to claim 20 wherein the conveyor worm, which is disposed on two sides of the exit opening as a left screw conveyor worm part and as a right screw conveyor worm part, which conveyor worm parts end on two sides in the region in front of the exit opening, wherein the at least one radial row of tamping tools and/or knives is placed in the region between the conveyor worm parts in the region above the exit opening.

22. The processing apparatus according to claim 19 wherein the feed opening runs over a circumferential region of from 45 to 180 angular degrees above and on this side above the circumference of the transport tubes in a small distance from each other, and each other nearly touching, and wherein the longitudinal axes of the processing drum and of the worm tubes include together at least one acute angle, wherein the feed opening is covered by the drying container.

23. Processing apparatus for thermoplastic plastic material comprising of a comminuting apparatus for comminuting and conveying and of an immediately following extruder machine, for plastification and in particular for forming granules, wherein the comminuting apparatus of which circulates with a single knife carrying processing drum (3), which processing drum (3) circulates driven in a horizontally disposed conveyor tube (6), wherein the conveyor tube (6) is furnished with a feed opening (11) substantially upwardly directed and with an exit opening (10) for the plastic material and wherein the knives (4) are distributed over the knife supporting part (17) of the processing drum (3) and are disposed conveying in axial direction (20) relative to the exit opening (10) and cooperate with at least one spatially fixed counter knife (5) and the knives supporting part (17) of the processing drum (3) and wherein a movable charge device (2) for the plastic material is coordinated to the feed opening (11) of the processing drum (3) in a predisposed feed shaft (14) surrounding from all sides the processing drum (3)
wherein
the feed opening (11) is worked in essentially through the knife carrying part (17) into the about a quarter of the circumference of the conveyor tube (6), down reaching from the top up to the middle of the conveyor tube (6) in an axial direction (20), wherein the single moving work member of the moving charge apparatus (2) feeds the plastic material into which processing tube (3), which charge device (2) is adapted in the feed speed to the filling level of the processing drum (3) and is controllable in a reverse ratio to the filling level and to which knife carrying part (17) follows the discharge member supporting part (18) of the processing drum (3), in particular with a conveyor worm (9) and wherein the exit opening (10) is placed at the circumference of the conveyor tubes (6) and directed essentially downwardly in the end region (21) of the conveyor screw (9), wherein an extruder device (8) follows to the fill opening of the worm tubes (22) of an extruder worm (8) of the extruder apparatus, wherein two inner walls (23, 24), followed to each other essentially immediately and wherein the paths of the discharge members (19) of the processing drum (3) and of the extruder screw (8) are running in a slight distance from each other, in particular each other nearly contacting, and wherein the longitudinal axes of processing drum (3) and of worm tube (22) include together at least one acute angle.

24. Processing apparatus according to claim 23 characterized in that the feed opening (11) of the conveyor tube (6) is pre-disposed to a feed shaft (14), wherein the feed shaft (14) closes with a floor plate (7), wherein the floor plate is disposed inclined and of falling at an angle relative to the feed opening (11), wherein the floor plate (7) reaches up to the opening edge (26) disposed following in circumferential direction (25) of the processing drum (3) and over the complete length of the feed opening (11) and of the driven and moving charge device (2);
characterized in that the charge device (2) is formed by a movable slider (30), wherein the movable slider (30) reaches over the width of the floor plate and is slidable on the floor plate (7) up to the feed opening (11) of the processing drum (3), at a right angle to the axial direction (20) of the conveyor tube (6) by a hydraulic force cylinder (27);
wherein the slider (30), which slider (30) is moved by a hydraulic force cylinder (27), in particular with an electro-hydraulically controlled pressure plant, and wherein the hydraulic force cylinder (27) exerts an automatically controllable pressure force onto the plastic material to be charged, wherein the pressure force of the slider (30) can be automatically controlled depending on the current consumption of the drive motor of the extruder worm (8) and/or of the drive motor of the processing drum (3).

25. Processing apparatus according to claim 23 characterized in that in each case at least one, but in particular several and preferably from 3 to 4 knives (4) are attached along a radial row at the circumference of the processing drum (3) and are attached to the processing drum (3), wherein the knives (4) are preferably disposed along the circumferential screw line (28) and wherein the knives (4) run together with at least one spatially fixed counter knife (5), which spatially fixed counter knife (5) reaches, in particular going throughout, over the full length of the feed opening (11) in an axial direction (20), wherein the periphery of the cutters of the moving knives (4) comb closely and without touching with the periphery of the cutters of the counter knife (5) and wherein the over their full cutting length cutting knives (4, 5) are essentially disposed lying in a plane;
characterized in that the rotation speed of the processing drum (3) can be automatically controlled depending on the temperature of the plastic material at the exit opening (10) of the conveyor tube (6);
characterized in that the processing drum (3) with its axial longitudinal direction (20) is aligned at a right angle to the longitudinal axis (31) of the extruder screw (8) and of the worm tube (22) and is attached to the worm tube (22); characterized in that several baffle plates (13) are attached at the inner wall (24) of the conveyor tubes (6) at distances from each other, wherein in case of an arrangement of the knives (4) on the processing drum (3) along a circumferential screw line (28), then the arrangement of the knives (4) exhibits of the same helical sense as the several baffle plates (13);

characterized in that the other circulation direction (25) of the processing drum (3) coincides with the transport direction of the extruder screw (8) at the exit opening (10);

characterized in that the feed opening (11) reaches over part of the knife carrying part (17) of the processing drum (3) and/or several spatially fixed counter knives (5) are applied over the complete length of the knife carrying part (17) of the processing drum (3);

characterized in that the knife carrying part (17) of the processing drum (3) reaches over the complete to length of the processing drum (3) and covers the exit opening (10) with the knives (4) disposed in the end region (21) of the exit opening (10), wherein at least one counter knife (5) ends at the feed opening (11) in front of an end region (21) of the processing drum (3) disposed in the closed part of the conveyor tube (6).

26. Processing apparatus according to claim 23 characterized in that the discharge member carrying part (18) of the processing drum (3) carries discharge members (19), wherein the discharge members (19) reach at least over a step winding of a screw line over the circumference of the processing drum (3) and at least the exit opening (10) of the conveyor tube (6) covers and is formed by a single step conveyor screw (9);

characterized in that several, preferably four, screw blades with a small axial extension relative to the discharge member (19) or relative to the conveyor screw (9) and with an opposite helical screw direction are attached at the end of the discharge member carrying part (18) of the processing drum (3);

characterized in that one or several knives (37) rotating within the processing the drum (3) are disposed at the end of the discharge member carrying part (18) of the processing drum (3), and preferably two or four knives (37) are attached in a radial row, at standard distances distributed over the circumference of the processing drum (3) with knife holders (40), and that several, preferably two radial rows of knives (37) are disposed in axial direction at distances next each other on the processing drum (3), wherein the neighboring knives (37) of neighboring radial rows are disposed step wise staggered relative to each other on the processing drum (3) in circumferential direction and the circulating knives (37) combing engagingly cut together with the spatially fixed knives (37');

characterized in that the spatially fixed knives (37') are attached together with the knife holders (40') on a receiver part (38) insertable into the conveyor tube, and which spatially fixed knives (37') are preferably disposed in a row, and which receiver part (38) is preferably attached by a side access opening;

characterized in that the circulating knives (37) disposed on the jacket of the conveyor drum (3) are disposed in an axial plane (53) of the transport drum (3) with a front edge directed in the circulating direction (25) or the circulating knives are disposed leading relative to the front edge and are attached passing by with the outer edges at the outer circumference of the transport members of the extruder screw (8) at a distance small relative to the size of the particles of the material to be processed;

characterized in that the circulating knives (37) of the processing drum (3) are attached to a cutter bush (36), wherein the cutter bush is slid onto the processing drum (3);

characterized in that a pressure ring (39) is inserted between the cutter bush (36) and the bearing casing (50) closing the conveyor tubes (6) on the front face, wherein the diameter of the pressure ring (39) is larger than the diameter of the processing drum (3) and wherein the pressure ring (39) is preferably sealingly reaching up to the inner wall of the conveyor tube (6) and there forms a slot (51) of a diameter of in particular from about 0.2 to 0.4 mm, wherein a labirynth seal is placed at the front side circumferential region of the slot (51) directed to the front side of the bearing casing (36).

27. Processing apparatus for the comminuting and the conveying of thermoplastic plastic material comprising a comminuting device for the comminution and conveying of an immediately following extruder apparatus, for plastification and in particular granulation, wherein the comminuting device of the extruder device is furnished with a single, in particular knife carrying processing drum (3), wherein the processing drum (3) runs driven in a horizontally disposed conveyor tube (6), wherein the conveyor tube (6) is furnished with a feed opening (11) substantially upwardly directed and with a predisposed feed shaft (14) for the plastic material surrounding the feed opening (11) on all sides and with an exit opening (10), wherein a conveyor screw is disposed above the processing drum (3) and is constructed transporting in an axial direction relative to the exit opening (10), characterized in that the feed opening (11) of the processing drum (3), to which processing drum (3) there is pre-disposed a feed device (2) for the feeding of the plastic material into the processing drum (3), wherein the casing (41) formed as a conveyor tube is incorporated essentially over the part of the processing drum (3) carrying the conveyor screw, which processing drum (3) ends in the region in front of the exit opening (10) at the circumference of the conveyor tube (6), wherein the exit opening (10) is a substantially downwardly directed, wherein at least one row of tamping tools and/or knives is applied in the region above the exit opening (10), wherein the feed speed is automatically controllable adapted to the degree of filling of the processing drum (3) and in the inverse ratio to this degree of filling, wherein the filling opening of the worm tubes (22) of an extruder screw (8) follows to the exit opening (10), wherein two inner walls substantially immediately connect to each other, wherein the paths of the discharge members (19) of the processing drum (3) and of the extruder screw (8) are running at a small distance to each other, and in particular nearly touching each other, and wherein the longitudinal axes of the processing drum (3) and of the worm tubes (22) include with each other an acute to rectangular angle.

28. Processing apparatus according to claim 27 characterized in that the charge device (2) comprises a shaft-shaped drying container (45), wherein the drying container (45) is furnished with an upper feed device (49), wherein the one of feeds (46) for the drying gas, in particular air, is lead to a blow-in nozzle (44), which blow-in nozzle (44) is disposed in the region above the feed opening (11), which the feed opening is led with the received humidity of the material into the upper region of the drying container (45) over a discharge line to the exit (48) and away from the exit (48) or is fed to a processing plant (47) for cleaning and drying, wherein the drying gas of the feed (46) is fed from the processing plant (47) to the blow-in nozzle (44);

characterized in that the conveyor worm, which is disposed on two sides of the exit opening (10) as a left screw conveyor worm part (42) and as a right screw conveyor worm part (43), which conveyor worm parts end on two sides in the region in front of the exit opening (10), wherein the at least one radial row of tamping tools and/or knives is placed in the region between the conveyor worm parts (42, 43) in the region above the exit opening (10);

characterized in that the feed opening (11) runs over a circumferential region of from 45 to 180 angular degrees above and on this side above the circumference of the transport tubes (3) in a small distance from each other, in particular each other nearly touching, and wherein the longitudinal axes of the processing drum (3) and of the worm tubes (22) include together at least one acute angle, wherein the feed opening (11) is covered by the drying container (45).

\* \* \* \* \*